(12) United States Patent
Eichhorst et al.

(10) Patent No.: US 7,093,884 B2
(45) Date of Patent: Aug. 22, 2006

(54) BULKHEAD MODULE FOR AN AUTOMOTIVE VEHICLE HAVING A CONVERTIBLE ROOF

(75) Inventors: Stefan W. Eichhorst, Bloomfield, MI (US); Timothy J. Olind, Plymouth, MI (US); Gary J. Forgue, Northville, MI (US)

(73) Assignees: ASC Incorporated, Southgate, MI (US); Wilhelm Karmann GmbH, Osnabruck (DE)

( * ) Notice: Subject to any disclaimer, the term of this patent is extended or adjusted under 35 U.S.C. 154(b) by 17 days.

(21) Appl. No.: 10/634,236

(22) Filed: Aug. 5, 2003

(65) Prior Publication Data
US 2004/0145211 A1    Jul. 29, 2004

Related U.S. Application Data

(60) Provisional application No. 60/403,691, filed on Aug. 15, 2002.

(51) Int. Cl.
*B60J 7/14* (2006.01)

(52) U.S. Cl. .......... 296/105; 296/107.08; 296/121; 296/107.17; 296/193.04

(58) Field of Classification Search .......... 296/105, 296/107.01, 107.08, 30, 203.04, 193.02, 296/193.04, 107.17, 121, 193.08, 120.1, 296/124; 292/DIG. 5
See application file for complete search history.

(56) References Cited

U.S. PATENT DOCUMENTS

| | | | |
|---|---|---|---|
| 2,704,225 A | 3/1955 | Anschuetz et al. | |
| 4,729,592 A | 3/1988 | Tuchiya et al. | |
| 4,776,630 A | 10/1988 | Fukutomi et al. | |
| 4,796,943 A | 1/1989 | Fukutomi et al. | |
| 4,854,634 A | 8/1989 | Shiraishi et al. | |
| 4,895,409 A | 1/1990 | Konishi et al. | |
| 5,078,447 A | 1/1992 | Klein et al. | |
| 5,090,764 A | 2/1992 | Kogawa et al. | |
| 5,195,798 A | 3/1993 | Klein et al. | |
| 5,209,544 A | 5/1993 | Benedetto et al. | |
| 5,265,930 A | 11/1993 | Klein et al. | |
| 5,542,735 A | 8/1996 | Furst et al. | |
| 5,551,743 A | 9/1996 | Klein et al. | |
| 5,558,388 A | 9/1996 | Furst et al. | |
| 5,641,193 A * | 6/1997 | Zepnik et al. | 296/107.09 |
| 5,645,309 A * | 7/1997 | Graf | 296/121 |
| 5,671,947 A | 9/1997 | Henn | |
| 5,769,483 A | 6/1998 | Danzl et al. | |
| 5,785,375 A | 7/1998 | Alexander et al. | |

(Continued)

FOREIGN PATENT DOCUMENTS

DE    196 43 225    5/1998

(Continued)

OTHER PUBLICATIONS

European Search Report, dated Oct. 24, 2003, 2 pages.

*Primary Examiner*—D. Glenn Dayoan
*Assistant Examiner*—Greg Blankenship
(74) *Attorney, Agent, or Firm*—Harness, Dickey & Pierce, P.L.C.

(57) ABSTRACT

A modular bulkhead assembly is provided for a convertible roof system for an automobile. The convertible roof system is mounted to the bulkhead or wall member including left and right linkage assemblies, an electronic control unit, and a hydraulic control system. The bulkhead module can then be assembled into a vehicle as a modular unit. The electronic control unit can then be connected to the vehicle power supply by connection of wire harnesses from the electrical control unit.

21 Claims, 11 Drawing Sheets

U.S. PATENT DOCUMENTS

| | | |
|---|---|---|
| 5,806,912 A | 9/1998 | Ramaciotti et al. |
| 5,881,458 A * | 3/1999 | Wolf et al. ............... 29/897.2 |
| 5,979,970 A | 11/1999 | Rothe et al. |
| 6,019,416 A | 2/2000 | Beierl |
| 6,053,560 A | 4/2000 | Rothe |
| 6,183,030 B1 | 2/2001 | Stender et al. |
| 6,217,104 B1 * | 4/2001 | Neubrand ................. 296/108 |
| 6,293,605 B1 | 9/2001 | Neubrand |
| 6,299,234 B1 | 10/2001 | Seel et al. |
| 6,312,042 B1 | 11/2001 | Halbweiss et al. |
| 6,318,793 B1 * | 11/2001 | Rapin et al. ........... 296/107.17 |
| 6,336,673 B1 | 1/2002 | Rothe et al. |
| 6,347,828 B1 | 2/2002 | Rapin et al. |
| 6,390,530 B1 * | 5/2002 | Maass ................. 296/107.09 |
| 6,390,532 B1 | 5/2002 | MacFarland |
| 6,419,294 B1 | 7/2002 | Neubrand |
| 6,425,621 B1 | 7/2002 | Miklosi et al. |
| 6,443,517 B1 * | 9/2002 | Just et al. ............. 296/107.09 |
| 6,454,344 B1 * | 9/2002 | Okada et al. ............... 296/121 |
| 6,497,447 B1 * | 12/2002 | Willard ..................... 296/108 |
| 6,508,502 B1 * | 1/2003 | Willard ................ 296/107.07 |
| 6,604,775 B1 * | 8/2003 | Obendiek ................. 296/108 |
| 6,629,719 B1 * | 10/2003 | Sims ......................... 296/109 |
| 6,659,534 B1 * | 12/2003 | Willard ..................... 296/108 |
| 2001/0005086 A1 | 6/2001 | Neubrand |
| 2001/0024050 A1 | 9/2001 | Schutt et al. |
| 2001/0040385 A1 | 11/2001 | Obendiek |
| 2001/0040386 A1 | 11/2001 | Miklosi et al. |
| 2001/0042991 A1 | 11/2001 | Schuler et al. |
| 2001/0042992 A1 | 11/2001 | Obendiek |
| 2001/0045759 A1 | 11/2001 | Russke |
| 2002/0024231 A1 | 2/2002 | Schutt |
| 2002/0030381 A1 | 3/2002 | Schutt et al. |
| 2002/0036413 A1 | 3/2002 | Neubrand et al. |
| 2002/0041109 A1 | 4/2002 | Wagner et al. |
| 2002/0050727 A1 | 5/2002 | Hasselgruber et al. |
| 2002/0060471 A1 | 5/2002 | Bergerhoff et al. |

FOREIGN PATENT DOCUMENTS

| | | |
|---|---|---|
| DE | 199 49 960 A1 | 4/2001 |
| WO | WO 03 020543 A1 | 3/2003 |

* cited by examiner

FIG 7
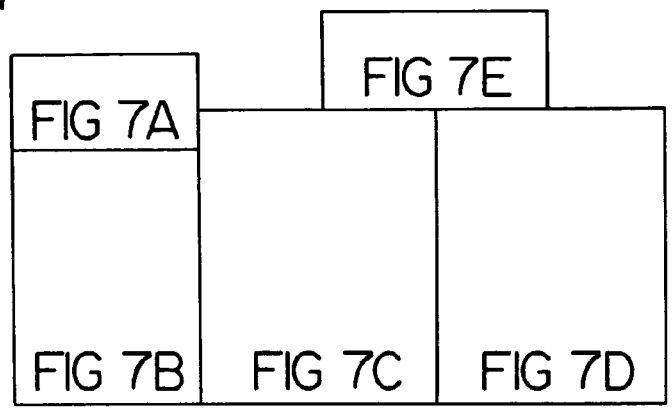
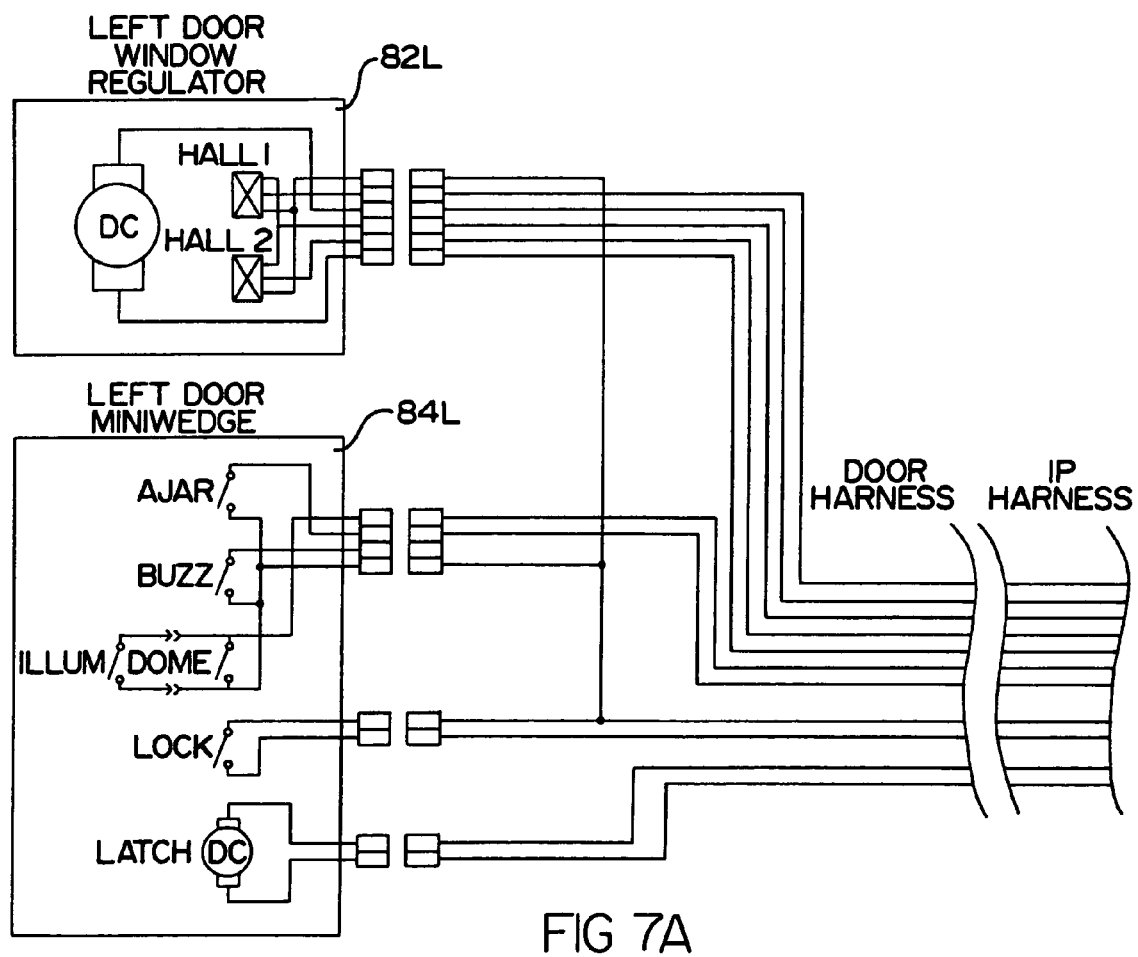
FIG 7A

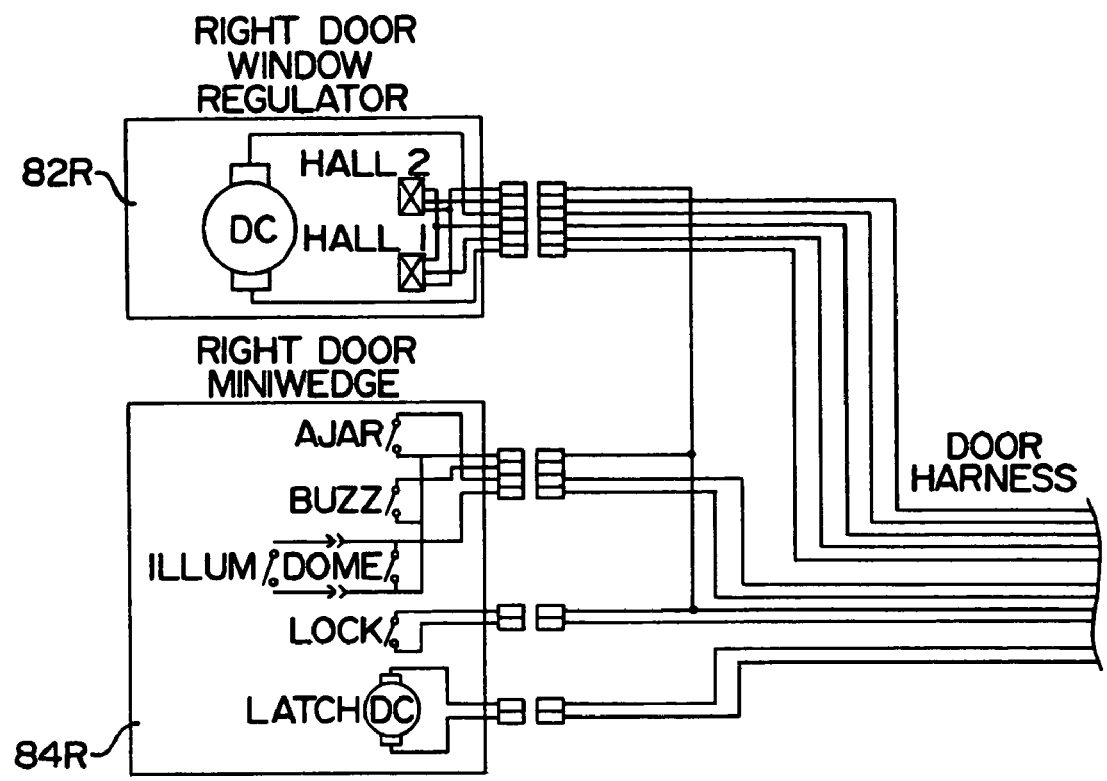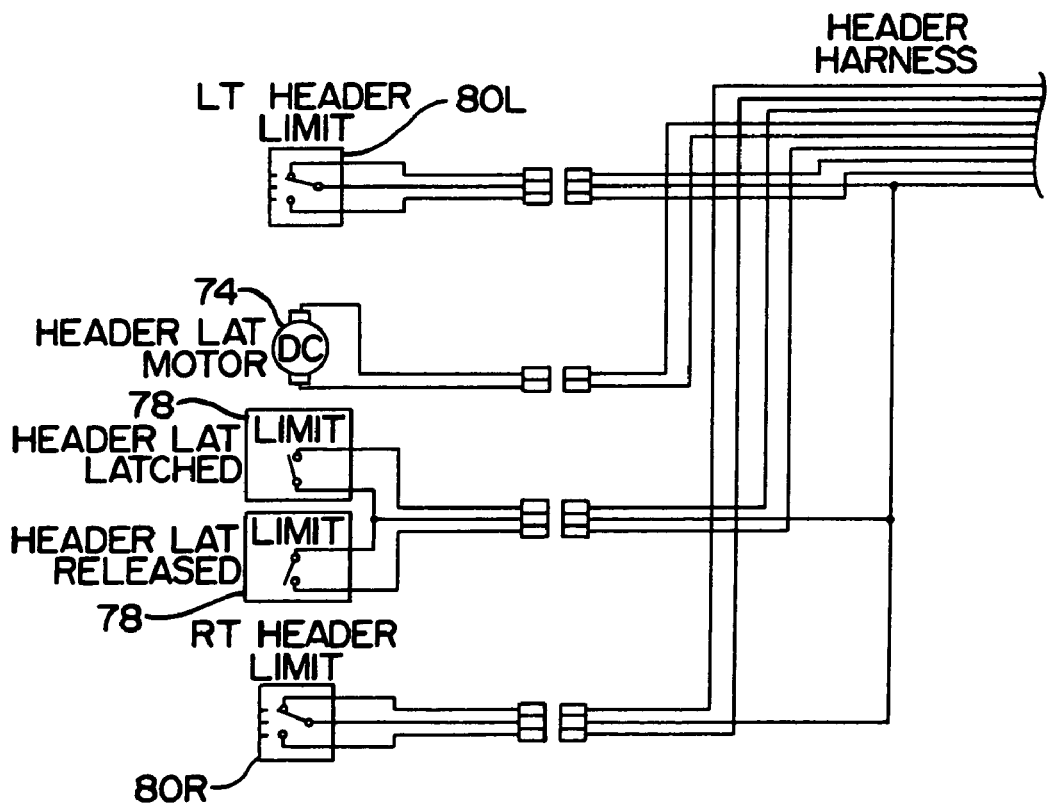
FIG 7B

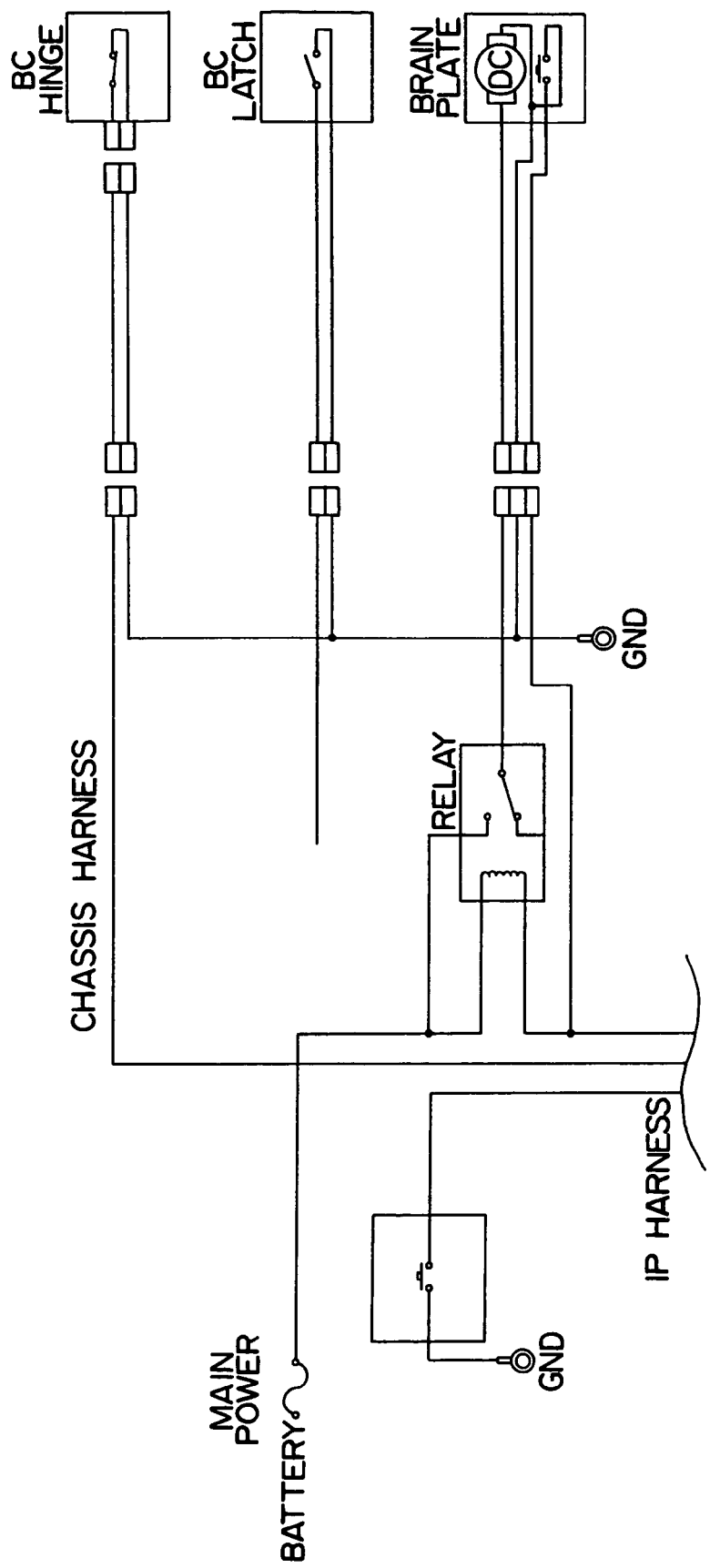

BULKHEAD MODULE FOR AN AUTOMOTIVE VEHICLE HAVING A CONVERTIBLE ROOF

CROSS-REFERENCE TO RELATED APPLICATIONS

This application claims the benefit of U.S. Provisional Application No. 60/403,691 filed on Aug. 15, 2002. The disclosure of the above application is incorporated herein by reference.

FIELD OF THE INVENTION

The present invention relates to automotive roof systems and more particularly to a bulkhead module for an automotive vehicle having a convertible roof.

BACKGROUND OF THE INVENTION

Rigid hard-top convertible roofs have been used on a variety of motor vehicles. Some of these conventional convertible hard-top roofs are stored in a generally vertical orientation, and some are stored in a predominantly horizontal orientation. Furthermore, some of these conventional hard-top roofs fold in a clam shelling manner while others are collapsible in an overlapping manner. Most convertible hard-top roofs, however, employ a complicated linkage arrangement to couple the forward most hard-top roof section to either the vehicle body or the rear hard-top roof section. This is often due to the weight and moment arm effect of the front roof section during retraction. For example, many of these known mechanisms use an elongated balance link coupling the body to the front roof section, or an elongated sliding or track guide secured to the vehicle body and coupled to a link. Notwithstanding, such mechanisms may pose packaging and assembly obstacles in the typically tight confines of the vehicle body. The additional time required for assembly of these complicated linkage assemblies into a vehicle can substantially affect the cost of a vehicle having a convertible roof.

Examples of traditional hard-top convertible roofs are disclosed in the following patents: U.S. Pat. No. 5,979,970 entitled "Roof Assembly for a Convertible Vehicle" which issued to Rothe et al on Nov. 9, 1999; U.S. Pat. No. 5,785,375 entitled "Retractable Hard-Top for an Automotive Vehicle" which issued to Alexander et al on Jul. 28, 1998; U.S. Pat. No. 5,769,483 entitled "Convertible Motor Vehicle Roof" which issued to Danzel et al on Jun. 23, 1998; U.S. Pat. No. 5,743,587 entitled "Apparatus for Use in an Automotive Vehicle Having a Convertible Roof System" which issued to Alexander et al on Apr. 28, 1998; and EPO Patent Publication No. 1 092 580 A1 which was published on Apr. 18, 2001, each of which is herein incorporated by reference.

SUMMARY OF THE INVENTION

In accordance with the present invention, a bulkhead module for an automotive vehicle is provided which has a convertible top assembly, an electronic controller and a hydraulic control system mounted to the bulkhead module prior to assembly into a vehicle so that the convertible roof system can be easily assembled into the vehicle by simple placement and mounting of the bulkhead module into the vehicle as a unit. According to additional aspects of the present invention, the electronic control unit, hydraulic control system, and sound system speakers can be mounted to a removable panel of the bulkhead module. According to still another unique aspect of the present invention, the bulkhead module is provided with placement pins which engage mounting holes provided on the body structure of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
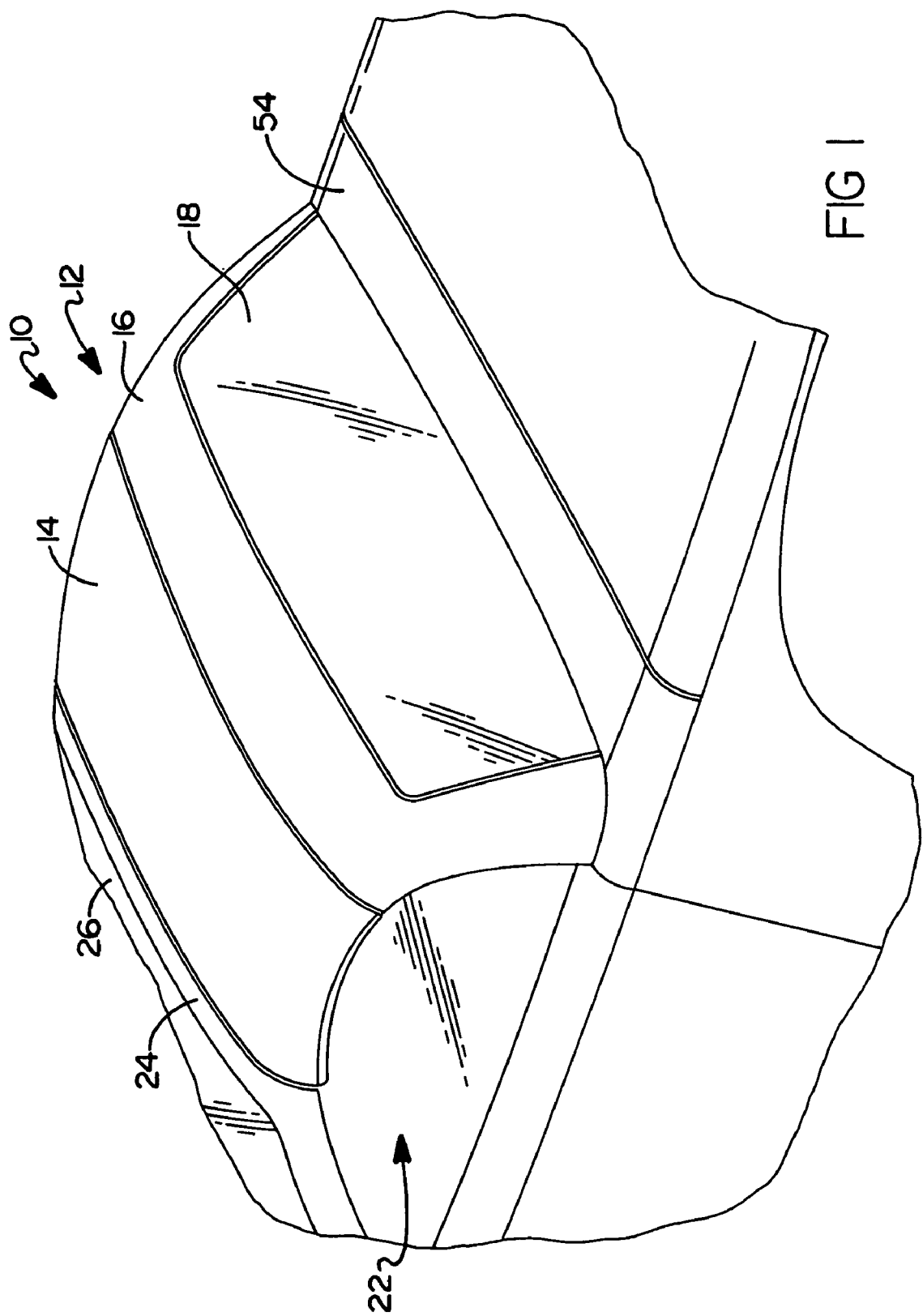
FIG. 1 is a fragmentary, perspective view, as observed from the rear left corner of a vehicle, showing the preferred embodiment of a hard-top convertible roof system of the present invention disposed in a fully closed and raised position.
Figure 2:
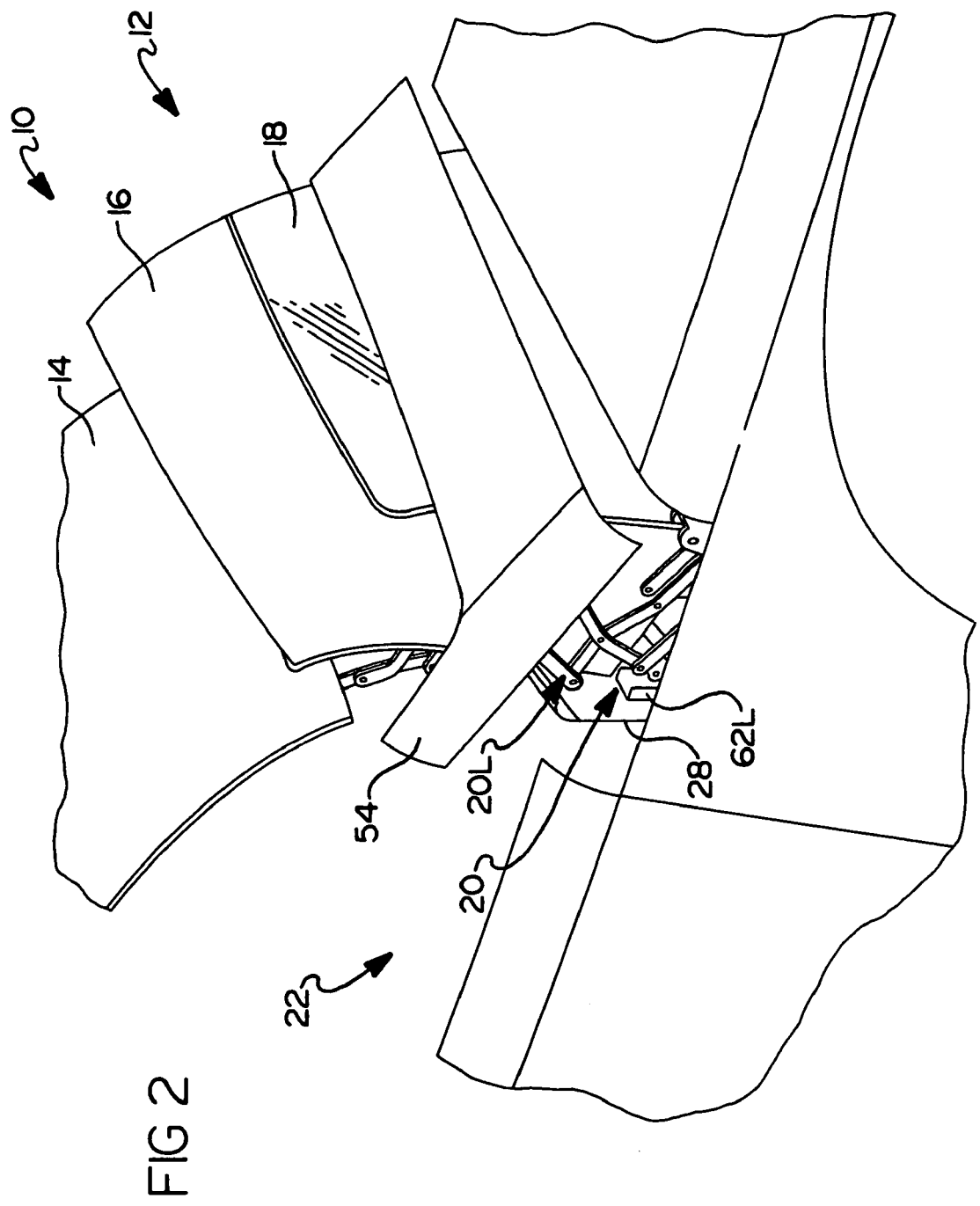
FIG. 2 is a fragmentary and perspective view, like that of FIG. 1, showing the preferred embodiment hard-top convertible roof system disposed in a partially retracted position.
Figure 3:
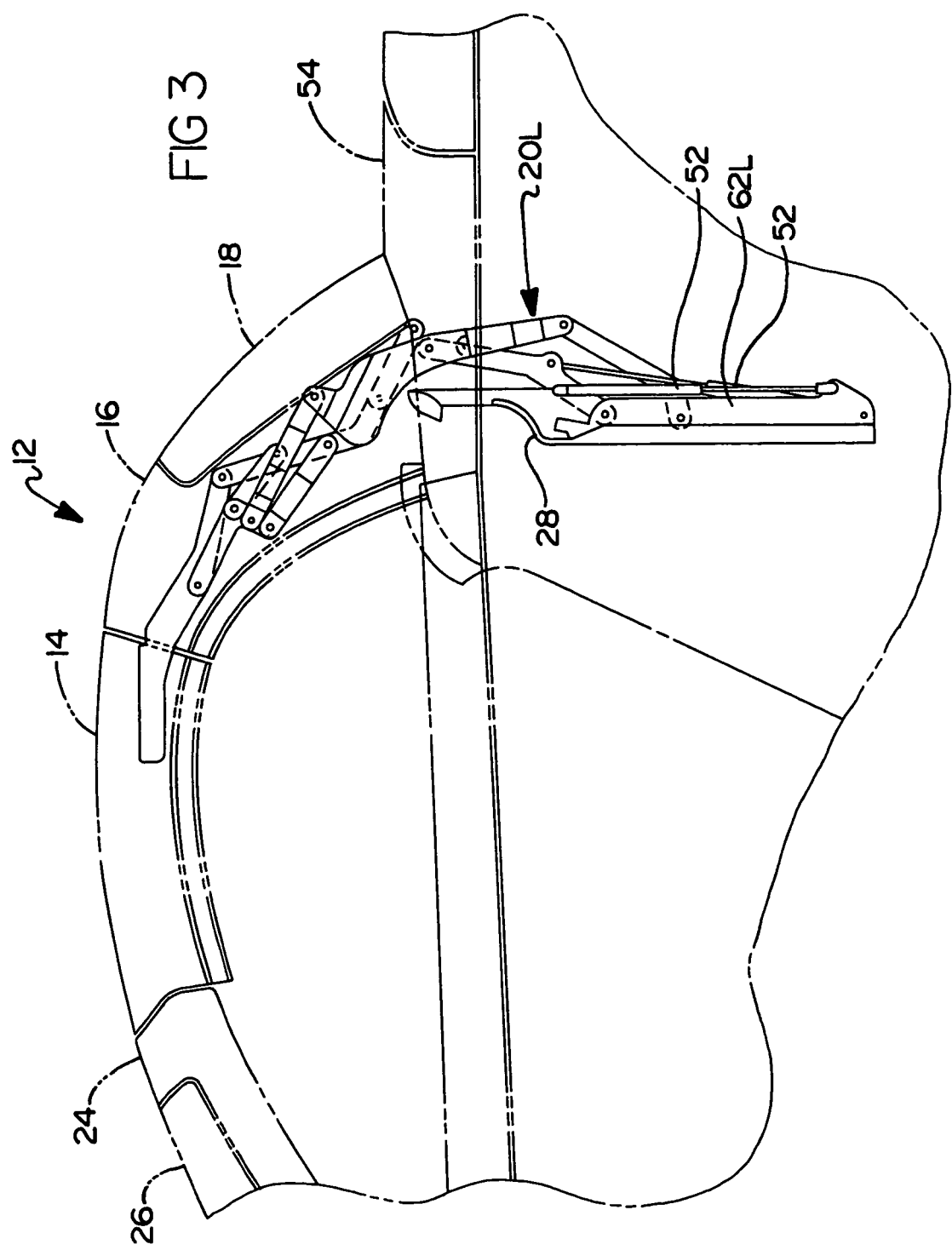
FIG. 3 is a side diagrammatic view showing the top stack mechanism and a tonneau cover mechanism employed in a hard-top convertible roof system, disposed in the fully raised roof and closed tonneau cover positions.

Referring to FIGS. 1–7, a vehicle 10 is provided with a convertible roof system 12 according to the principles of the present invention. The convertible roof system 12 includes a front roof panel 14 and a rear roof panel 16. The front and rear roof panels 14, 16 are generally rigid panels. The rear roof panel 16 includes a rear window or back light 18. The front and rear panels 14, 16 are retractably supported by a linkage system including left and right hand linkage assemblies 20L, 20R (the left hand linkage assembly 20L is best shown in FIGS. 2 and 3 with the right hand linkage assembly 20R being a mirror image thereof). The linkage system 20L, 20R is movable between a first extended position for supporting the front and rear roof panels 14, 16 in a position for covering the passenger compartment 22. In the extended position, the front panel extends to and engages the header 24 of the front windshield 26. The front and rear roof panels 14 and 16 are movable from the extended closed position covering the passenger compartment 22 to a fully retracted and open position wherein the panels are stored in a generally vertical overlapping orientation.

Figure 4:
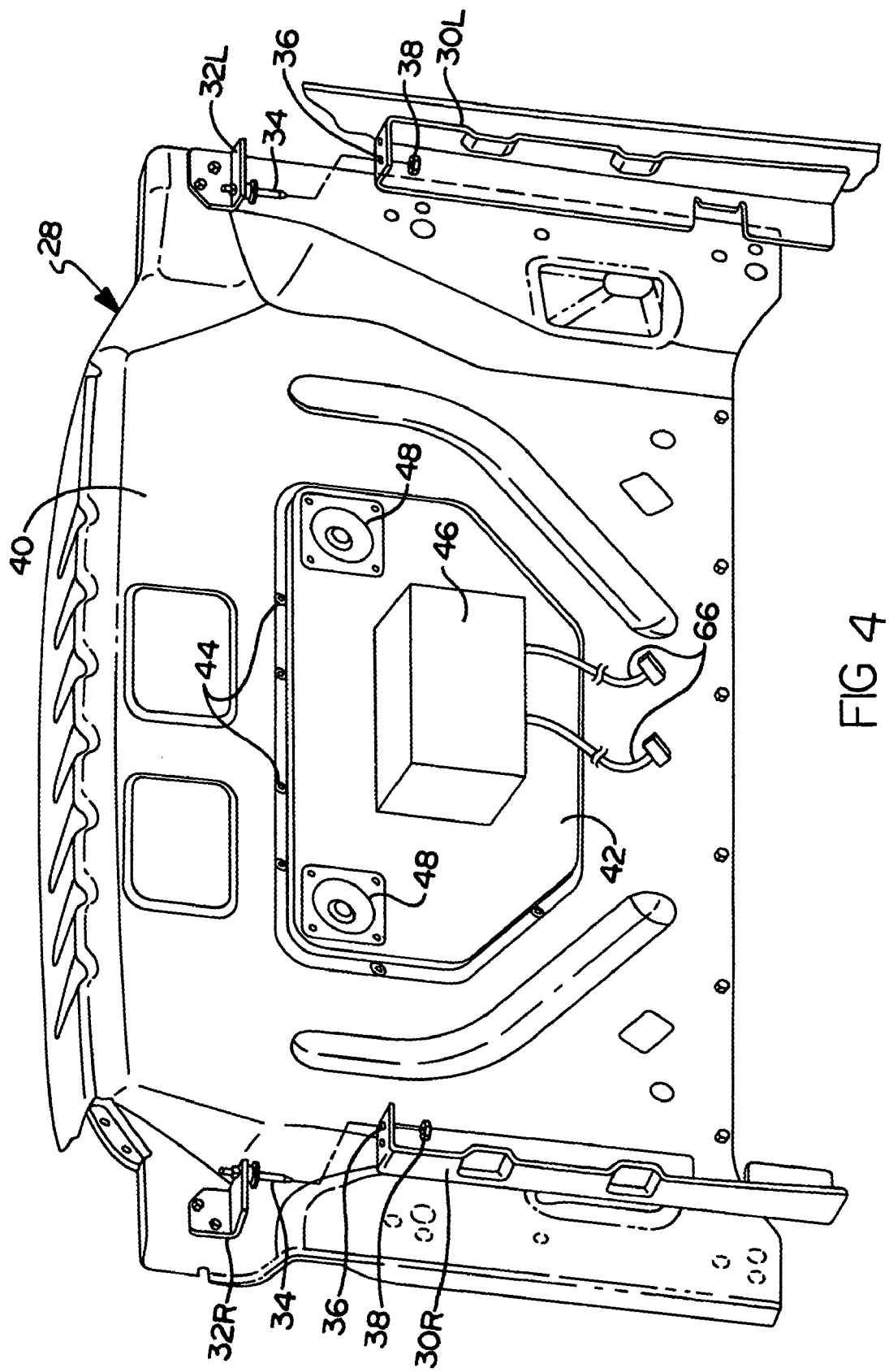
FIG. 4 is a front perspective view of the bulkhead module mounted within the vehicle body, according the principles of the present invention.

The left and right linkage assemblies 20L, 20R are each fixedly mounted to a wall member 28 such as a seatback wall or bulkhead. The wall member 28 extends across an interior width of the passenger compartment 22 and is mounted to opposing left and right body brackets 30L, 30R which are mounted to opposite sides of the vehicle body, as best shown in FIG. 4. The wall member 28 includes left and right mount brackets 32L, 32R, each of which support a mounting pin 34 which is received in a corresponding mounting hole 36 provided on each of the left and right body brackets 30L, 30R, respectively. As best shown in FIG. 4, each of the mounting pins 34 has a threaded portion for receiving a nut 38 thereon for securing the wall member 28 in place.

The wall member 28 includes a main body portion 40 having an opening provided in a center portion thereof which is covered by a removable panel 42, which is mounted to the main wall portion 40 by a plurality of bolts or other fasteners 44. An electronic control unit 46, as well as loudspeakers 48 for a vehicle sound system, are mounted to the removable panel 42 on a front side thereof.

Figure 5:
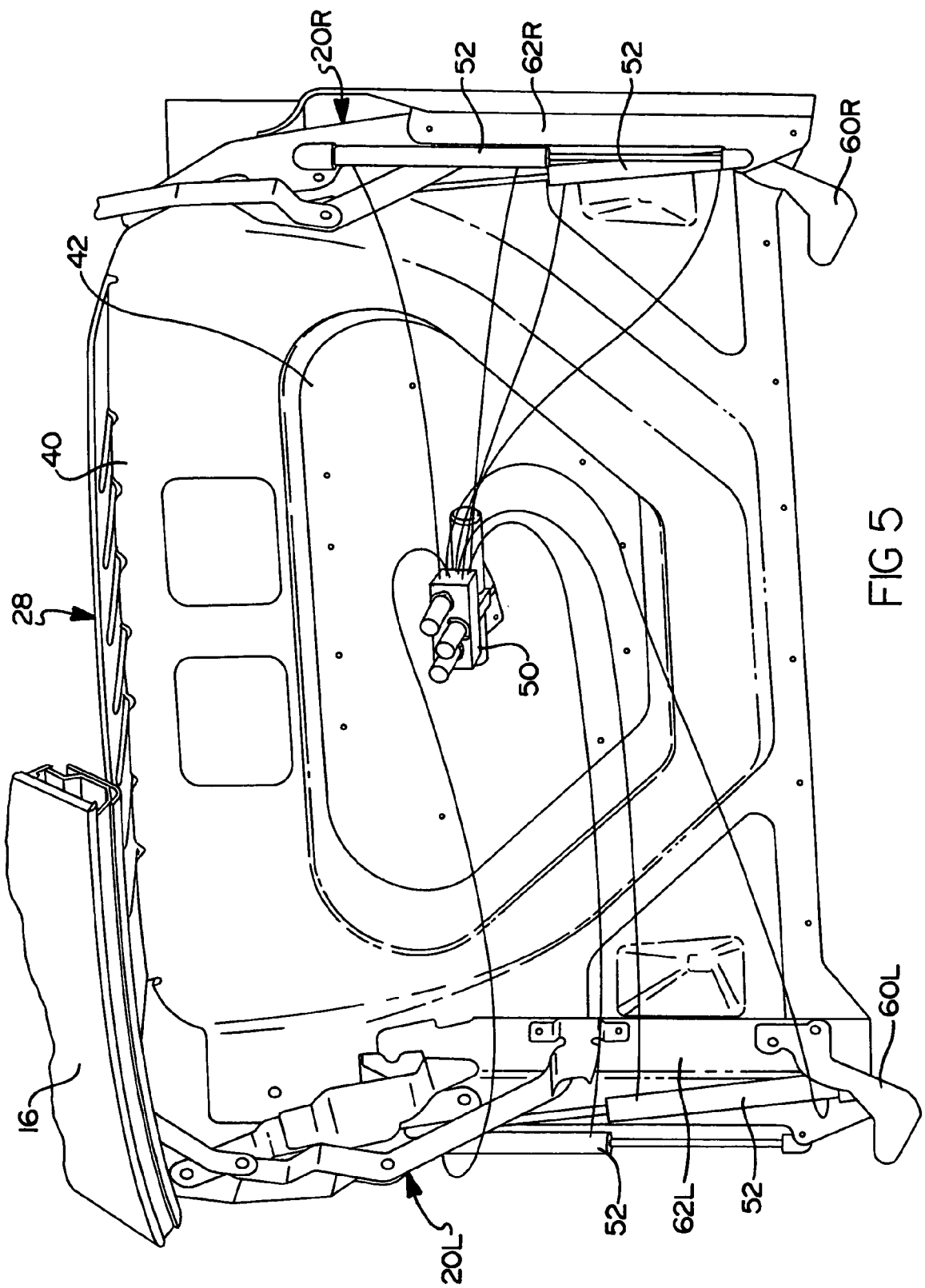
FIG. 5 is a rear view of the bulkhead module illustrating the convertible top linkage assembly mounted thereto, according to the principles of the present invention.
Figure 6:
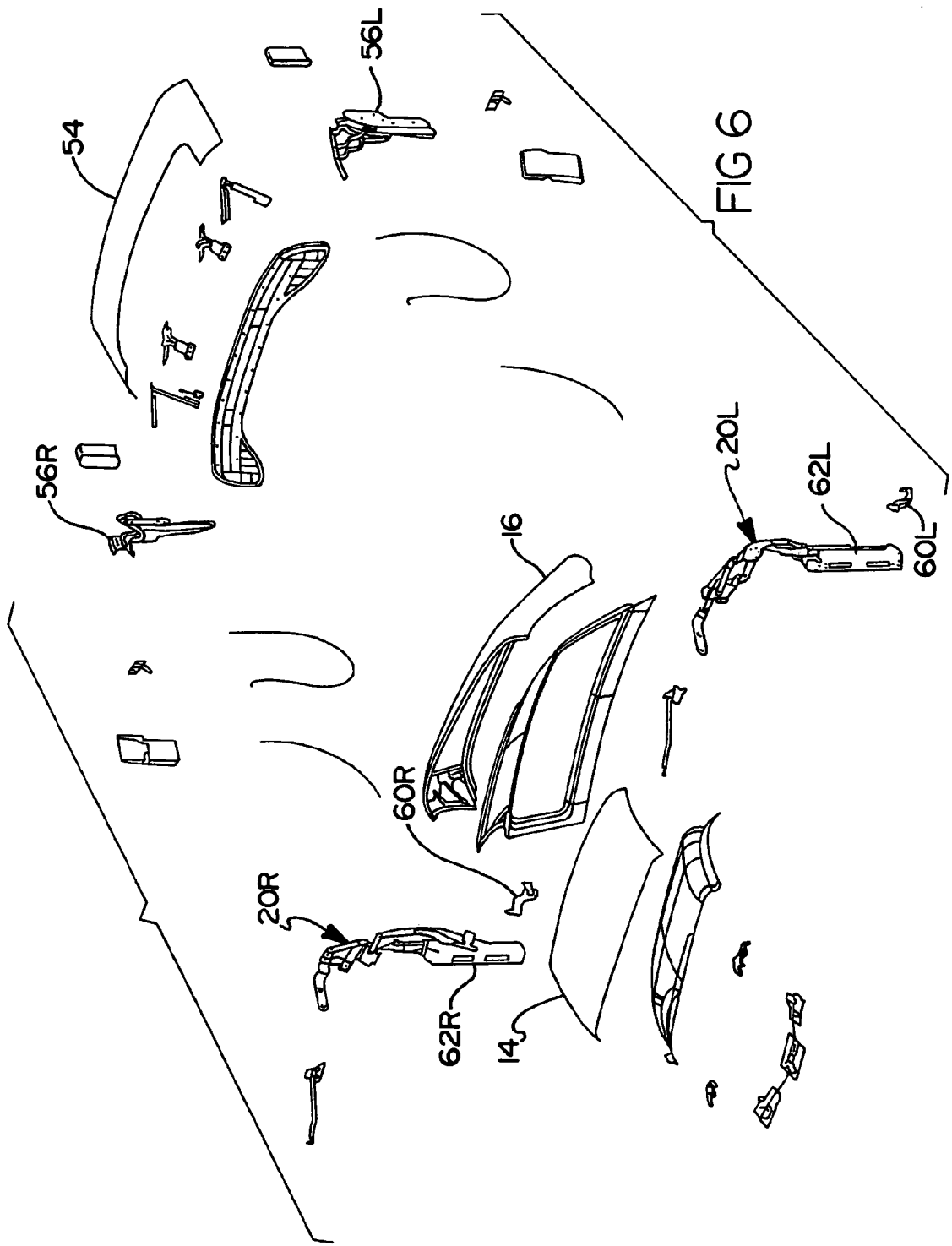
FIG. 6 is an exploded perspective view of the components of the convertible roof assembly and tonneau cover according to the principles of the present invention.
Figure 7C:
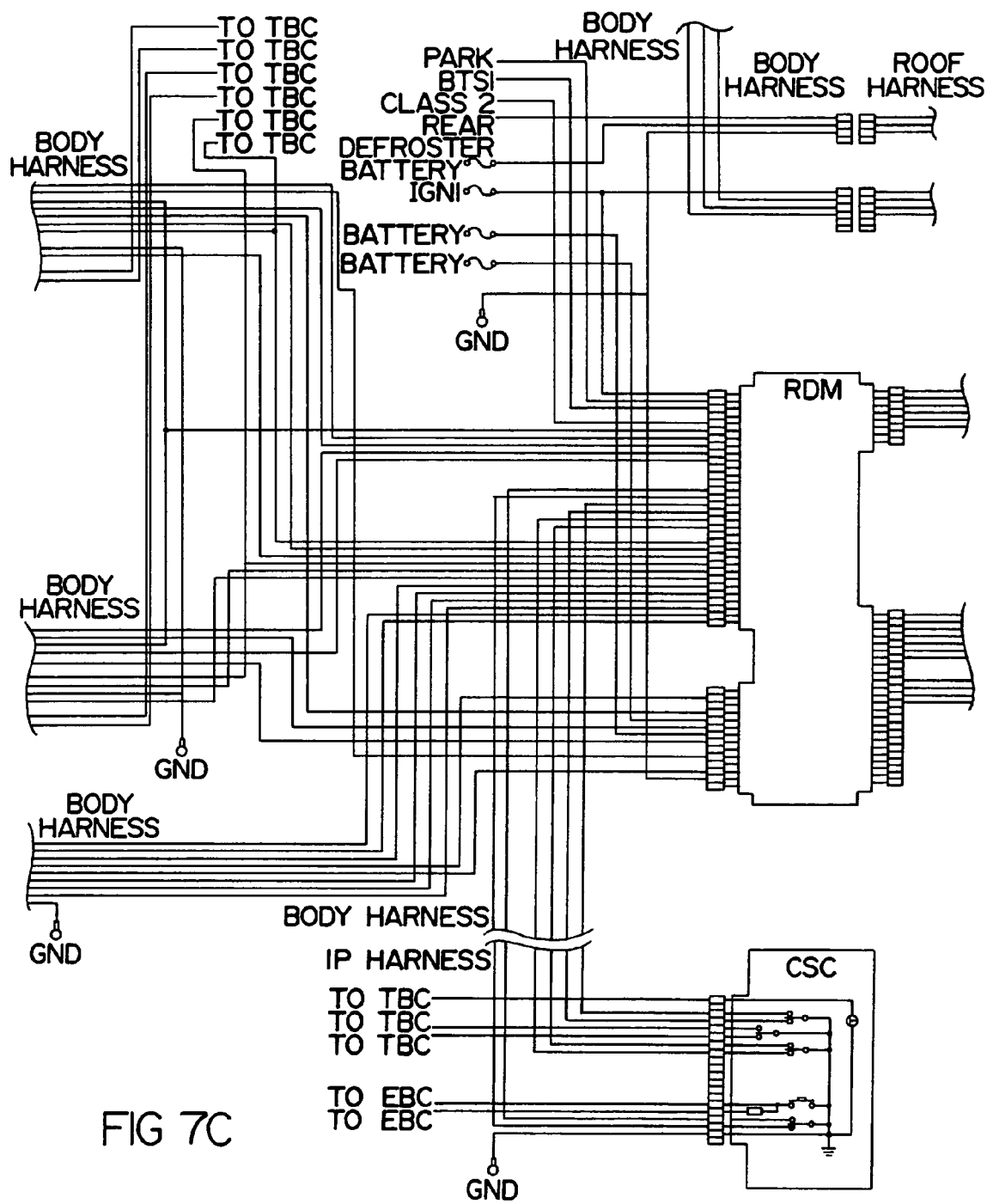
FIGS. 7–7E are a diagrammatic view of the electronic control system for the convertible roof system according to the principles of the present invention.
Figure 7D:
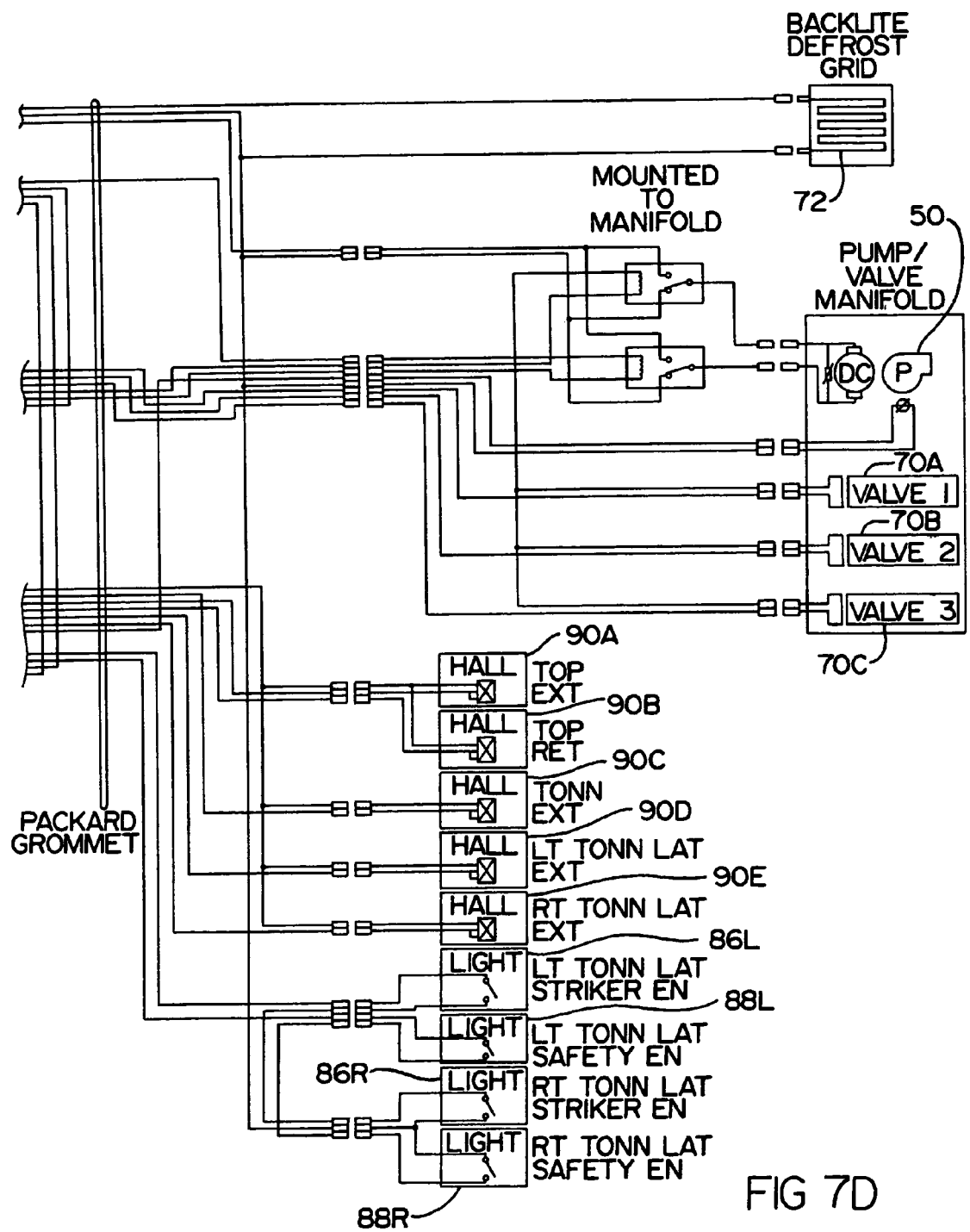

As best shown in FIG. 5, a hydraulic control system, including a hydraulic pump 50 is mounted to the removable panel 42. The hydraulic pump 50 provides hydraulic fluid to hydraulic actuators 52 of the linkage assemblies 20L, 20R for extending and retracting the linkage system. A schematic diagram of the electronic control system and the associated interconnections with the electronic control unit 46 and hydraulic control system, as well as other components, is illustrated in FIG. 7. According to one aspect of the present invention, the convertible roof system 12 is fully automated. The electronic control system controls the hydraulic pump 50 as well as a plurality of solenoid valves 70A–70C of the hydraulic control system. A backlite defrost grid 72 and a header latch actuator motor 74 for actuating a header latch 76 (illustrated in FIG. 6) are also controlled by the electronic control system. Limit switches 78 are provided for detecting whether the header latch 76 is latched or released. In addition, left and right header latch limit switches 80L, 80R are also provided. Left and right window regulators 82L, 82R and left and right door miniwedge systems 84L, 84R are part of the control system. The control system also includes left and right tonneau latch striker limit switches 86L, 86R, as well as hall sensors 90A–90E for detecting the top extension and retraction positions (90A, 90B) as well as the tonneau extension position (90C) and left and right tonneau latch positions (90D, 90E).

A tonneau cover 54 is pivotally mounted to the vehicle body and cooperates with the rear roof panel 16 to fully enclose the passenger compartment 22. A pair of left and right tonneau hinge assemblies 56L, 56R are provided for hingedly supporting the tonneau cover 54. The tonneau hinge assemblies 56L, 56R are mounted to the vehicle body. A pair of left and right bracket assembly latches 60L, 60R are provided for latching the linkage system in a retracted position.

During assembly, the left and right linkage assemblies 20L, 20R are mounted to the wall member 28 via the base brackets 62L, 62R. The front and rear roof panels 14, 16 can be either preassembled onto the linkage assemblies 20L, 20R or assembled onto the linkage assemblies 20L, 20R after assembly to the wall member 28. The loudspeakers 48, electronic control unit 46 and hydraulic pump 50 are mounted to the removable panel 42 which is then mounted to the base portion 40 of the wall 28. Additionally, the left and right lower latch assemblies 60L, 60R are mounted to the wall member 28. The wall member 28 is then installed into the vehicle by aligning the mounting pin 34 with the mounting holes 36 provided on the body brackets 30L, 30R. Once the mounting pins 34 are inserted in the holes 36, the nuts 38 are threaded onto the threaded portion of the mounting pins 34 in order to secure the wall member 28 in place.

The modular bulkhead assembly allows the convertible roof system 12 to be easily installed in the vehicle after being assembled as a modular unit separate from the vehicle. Once the convertible top modular assembly is installed, electrical connections with the electronic control unit 46 and vehicle power supply as well as other components of the electronic control system are connected via the wire harnesses 66.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A modular convertible top assembly for a vehicle, comprising:
    a modular support panel further comprising a substantially flat wall aligned on a substantially vertical plane and extending a majority of the distance between a vehicle floor and a vehicle beltline;
    two linkage assemblies mounted to said support panel;
    at least one roof panel, said linkage assemblies supporting the at least one roof panel that is movable between a passenger compartment covering position and a stowed position;
    a hydraulic system connected to at least one of said linkage assemblies and operably retracting and extending said at least one linkage assembly, said hydraulic system including a hydraulic pump mounted to said support panel; and
    an electronic control unit mounted to said support panel, said electronic control unit being connected with said hydraulic system for activating said hydraulic control system for controllably retracting and extending said at least one linkage assembly;
    wherein said modular support panel includes holes and offset surfaces on said substantially flat wall, and said wall extends transversely in said vehicle at least a majority of the distance between said two linkage assemblies.

2. The modular convertible top assembly according to claim 1, wherein said support panel is a removable bulkhead panel, said electronic control unit, and hydraulic pump are mounted to said removable panel.

3. The modular convertible top assembly according to claim 2, further comprising a sound system speaker mounted to said removable panel.

4. The modular convertible top assembly according to claim 1, wherein said support panel is removable from the vehicle in a non-destructive manner.

5. The modular convertible top assembly according to claim 1 wherein said support panel is adjacent the back of a vehicle seat.

6. The modular convertible top assembly according to claim 1, wherein the electronic control unit operably controls at least a window defroster and a latch motor.

7. The modular convertible top assembly according to claim 1, wherein the at least one roof panel comprises at least two hard-top, convertible roof panels.

8. The modular convertible top assembly according to claim 1 further comprising moving hinge assemblies to open and close a cover, the cover concealing at least part of the roof panel when the roof panel is fully retracted and the cover is closed.

9. A modular convertible top assembly for a vehicle, comprising:
- a wall member adapted to be mounted in a vehicle;
- a linkage assembly mounted to said wall, said linkage assembly supporting at least one roof panel that is movable between a first position for covering a passenger compartment and a second stowed position;
- a hydraulic control system connected to said linkage assembly for controllably retracting and extending said linkage assembly, said hydraulic control system including a hydraulic pump mounted to said wall;
- an electronic control unit mounted to said wall and in communication with said hydraulic control system for activating said hydraulic control system for controllably retracting and extending said linkage assembly; and
- a hold down bracket assembly mounted to said wall, said hold down bracket assembly adapted to lock said linkage assembly in said second stowed position.

10. The modular convertible top assembly according to claim 9 further comprising a sound system speaker mounted to said wall.

11. The modular convertible top assembly according to claim 9 further comprising controlling operation of a roof latch with the electronic control unit.

12. The modular convertible top assembly according to claim 9 further comprising controlling operation of a lamp with the electronic control unit.

13. The modular convertible top assembly according to claim 9 further comprising controlling operation of a defroster with the electronic control unit.

14. A modular convertible top assembly for a vehicle, comprising:
- a member adapted to be mounted to a body structure of a vehicle;
- a linkage assembly mounted to said member, said linkage assembly supporting at least one roof panel that is movable between a first position for covering a passenger compartment and a second stowed position; and
- at least one guide pin disposed on one of said member and said body structure of the vehicle, and at least one mounting hole disposed on the other of said member and said body structure, said at least one guide pin and said at least one mounting hole cooperating to define a positioning guide when said member is assembled to said body structure.

15. The modular convertible top assembly according to claim 14, further comprising a hydraulic control system connected to said linkage assembly for controllably retracting and extending said linkage assembly, said hydraulic control system including a hydraulic pump mounted to said member.

16. The modular convertible top assembly according to claim 15, further comprising an electronic control unit mounted to said member and in communication with said hydraulic control system for activating said hydraulic control system for controllably retracting and extending said linkage assembly.

17. The modular convertible top assembly according to claim 14 wherein the at least one roof panel comprises at least two hard-top, convertible roof panels.

18. The modular convertible top assembly according to claim 14 wherein the member is a bulkhead panel.

19. A preassembled convertible roof module comprising:
- a panel;
- a top stack linkage system mounted on the panel prior to final vehicle assembly;
- a latch motor;
- an electronic controller mounted on the panel, the electronic controller being operable to control the latch motor; and
- at least one guide pin projecting from the panel to assist in final vehicle assembly.

20. The module according to claim 19 further comprising a threaded attachment system coupled to the panel to assist in final vehicle assembly and allow the panel to be removable from the vehicle.

21. The module according to claim 19 further comprising a retractable hard-top roof coupled to the top stack linkage mechanism.

* * * * *